US 8,503,537 B2

(12) United States Patent
Endresen (10) Patent No.: US 8,503,537 B2
(45) Date of Patent: Aug. 6, 2013

(54) SYSTEM, METHOD AND COMPUTER READABLE MEDIUM FOR DECODING BLOCK WISE CODED VIDEO

(75) Inventor: Lars P. Endresen, Nesoddtangen (NO)

(73) Assignee: Tandberg Telecom AS, Lysaker (NO)

( * ) Notice: Subject to any disclaimer, the term of this patent is extended or adjusted under 35 U.S.C. 154(b) by 600 days.

(21) Appl. No.: 12/499,601

(22) Filed: Jul. 8, 2009

(65) Prior Publication Data
US 2010/0008429 A1  Jan. 14, 2010

(30) Foreign Application Priority Data

Jul. 9, 2008  (NO) .................................. 20083085

(51) Int. Cl.
*H04N 7/26*  (2006.01)
(52) U.S. Cl.
USPC .................................................... 375/240.24
(58) Field of Classification Search
USPC .................. 375/240.24, 240.29; 382/266–269
See application file for complete search history.

(56) References Cited

U.S. PATENT DOCUMENTS

| | | | | |
|---|---|---|---|---|
| 6,823,087 | B1 * | 11/2004 | Liu et al. ......................... | 382/266 |
| 6,963,341 | B1 * | 11/2005 | Mimar ............................. | 345/505 |
| 7,483,595 | B2 * | 1/2009 | Keithley et al. ................ | 382/307 |
| 2005/0117653 | A1 | 6/2005 | Sankaran | |
| 2005/0125641 | A1 * | 6/2005 | Ford et al. ....................... | 712/225 |
| 2008/0037650 | A1 * | 2/2008 | Stojancic et al. ........... | 375/240.24 |
| 2008/0123750 | A1 * | 5/2008 | Bronstein et al. .......... | 375/240.24 |
| 2011/0087859 | A1 * | 4/2011 | Mimar .............................. | 712/4 |

OTHER PUBLICATIONS

Ye Jianhong; Liu Jilin; , "Fast parallel implementation of H.264 /AVC transform exploiting SIMD instructions," Intelligent Signal Processing and Communication Systems, 2007. ISPACS 2007. International Symposium on , vol., No., pp. 870-873, Nov. 28, 2007-Dec. 1, 2007 doi: 10.1109/ISPACS.2007.4446026.*
Fanchetti, Franz et al., "Generating SIMD Vectorized Permutations," Compiler Construction, vol. 4959, Apr. 3, 2008 15 pages, ISBN 978-3-540-78790-7.
Combined Office Action and Search Report issued Sep. 13, 2012 in Chinese Patent Application No. 200980126897.X with English language translation.
European Office Action issued Oct. 24, 2012 in Patent Application No. 09 794 693.3.

* cited by examiner

*Primary Examiner* — Mehrdad Dastouri
*Assistant Examiner* — Mohammed Rahaman
(74) *Attorney, Agent, or Firm* — Oblon, Spivak, McClelland, Maier & Neustadt, L.L.P.

(57) ABSTRACT

An apparatus and associated method are provided for decoding of block wise coded video pictures. Implementing a deblocking filter algorithm or the like in a single instruction multiple data (SIMD) environment, especially for processors with 128-bit vector registers. Parallelism between the SIMD and the register size fits the macroblock size disclosed in the H.264 and MPEG-4 standards is exploited by using transpositions and transformations of luminance and chrominance macroblocks in vertical de-blocking filter operations.

18 Claims, 8 Drawing Sheets

| a0 | b0 | c0 | d0 | e0 | f0 |
| a1 | b1 | c1 | d1 | e1 | f1 |
| a2 | b2 | c2 | d2 | e2 | f2 |
| a3 | b3 | c3 | d3 | e3 | f3 |

| index A (for α) or index B (for β) | | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

| index A (for α) or index B (for β) | | | | | | | | | | | | | | | | | | | | | | | | | | |
|---|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 | 18 |

| index A | | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| bS =1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bS =2 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| bS =3 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |

| index A | | | | | | | | | | | | | | | | | | | | | | | | | | |
|---|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| bS =1 | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| bS =2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| bS =3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

SYSTEM, METHOD AND COMPUTER READABLE MEDIUM FOR DECODING BLOCK WISE CODED VIDEO

BACKGROUND

The transmission of moving pictures in real-time is known and utilized in applications such as video conferencing, net meetings, TV broadcasting and video telephony. However, representing moving pictures requires bulk information as digital video and is typically described by representing each pixel in a picture with 8 bits (1 Byte). Such uncompressed video data results in large bit volumes, and can be difficult to transfer over conventional communication networks and transmission lines in real time due to limited bandwidth.

Thus, enabling real time video transmission may require a large extent of data compression. Data compression may, however, compromise picture quality. Therefore, efforts have been made to develop compression techniques allowing real time transmission of high quality video over bandwidth-limited data connections.

A number of algorithmic capabilities are generally common between multiple video decoding/encoding standards, such as MPEG-*, H.26*, and SMPTE-VC-1. Deblocking filtering and motion estimation/compensation are two typical examples of general algorithms that are required for video encoding. The coding is performed on block wise parts of the video picture. A macro block consists of several sub blocks for luminance (luma) as well as for chrominance (chroma).

Blockbased coding/decoding has proven to be very efficient. However, one of the drawbacks is that the reconstructed image may include visible artifacts corresponding to the blocks used for prediction and residual signal coding. This phenomenon is usually referred to as blocking or blocking artifacts.

One way of reducing blocking artifacts is to integrate a de-blocking filter in the coding loop, which is the preferred solution in the specification ITU-T Rec. H.264 | ISO/IEC 14496-10 AVC. This coding integrated solution is processor consuming because it requires a test procedure for each pixel line crossing the block edges to be smoothed.

Although the de-blocking filter, per se, is not complex, during the filtering process almost every pixel of a reconstructed picture frame needs to be accessed by the filtering algorithm. The de-blocking operation is therefore quite processor consuming.

Video encoding for high-definition (HD) formats increase the demands for memory and data processing, and requires efficient and high bandwidth memory organizations coupled with compute intensive capabilities. Due to these multiple demands, a flexible parallel processing approach must be found to meet the demands in a cost effective manner.

To efficiently support de-blocking filtering algorithms and other complex programmable functions, which may vary in requirements across the multiple standards, a processor alone would require significant parallelism and very high clock rates to meet the requirements. A processor of this capability would be cost prohibitive for commercial products.

In many cases the de-blocking filter is one of the main bottlenecks in both the encoding and the decoding process, especially for high resolution images as in the case of HD. As the filtering occurs on a per macroblock basis, with horizontal filtering of the vertical edges performed first, and followed by vertical filtering (of the horizontal edges), both directions of filtering on each macroblock must be conducted before moving to the next macroblock. Video codecs are typically installed on customized hardware in video endpoints with digital signal processing (DSP) based processors. However, it has recently become more common to install video codecs in general purpose processors with a SIMD processor environment. When implemented in typical general purpose processors, each macroblock must typically be loaded from a random access memory (RAM) to registers in the general purpose processor twice, once for vertical de-blocking filtering, and once for horizontal de-blocking filtering, and possibly transposing each macroblock in several inefficient and small steps. This is particularly demanding computationally as it involves loading distant memory references.

In light of the above deficiency in the art, currently, a video de-blocking process is desired in which the number of times macroblocks are loaded from memory and computational overhead are reduced.

SUMMARY

In one aspect, a method for performing a de-blocking filter operation on boundary neighboring pixels between macroblocks in a video coding or decoding process executed in a 16-bytes SIMD register processor environment is provided. The method includes steps of loading a first set of data constituting one luminance macroblock or two chrominance macroblocks from a RAM to a group of 16 16-bytes horizontal SIMD register variables by inserting each row of the block(s) in the respective register variables, and executing a transpose instruction on the first set of data in the group of 16 16-bytes horizontal SIMD register variables creating a second set of data which is being stored in the group of 16 16-bytes horizontal SIMD register variables.

Further, a horizontal de-blocking filter operation is performed on the second set of data in the group of 16 16-bytes horizontal SIMD register variables and a corresponding set boundary pixel data of a first neighboring macroblock, and a transpose instruction on the second set of data in the group of 16 16-bytes horizontal SIMD register variables is executed, creating a third set of data which is being stored in the group of 16 16-bytes horizontal SIMD register variables. Additionally, a vertical de-blocking filter operation is performed on the third set of data in said group of 16 16-bytes horizontal SIMD register variables and a corresponding set of boundary pixels data of a second neighboring macroblock.

BRIEF DESCRIPTION OF THE DRAWINGS

A more complete appreciation and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification.

DETAILED DESCRIPTION

The following detailed description provides an aspect of implementing de-blocking filters for reducing artifacts in video images in general purpose microprocessors and computing platforms. In one aspect, the implementation is particularly suited for ITU-T Rec. H.264 | ISO/IEC 14496-10 AVC, the basics of which are described in the following.

Figure 9:
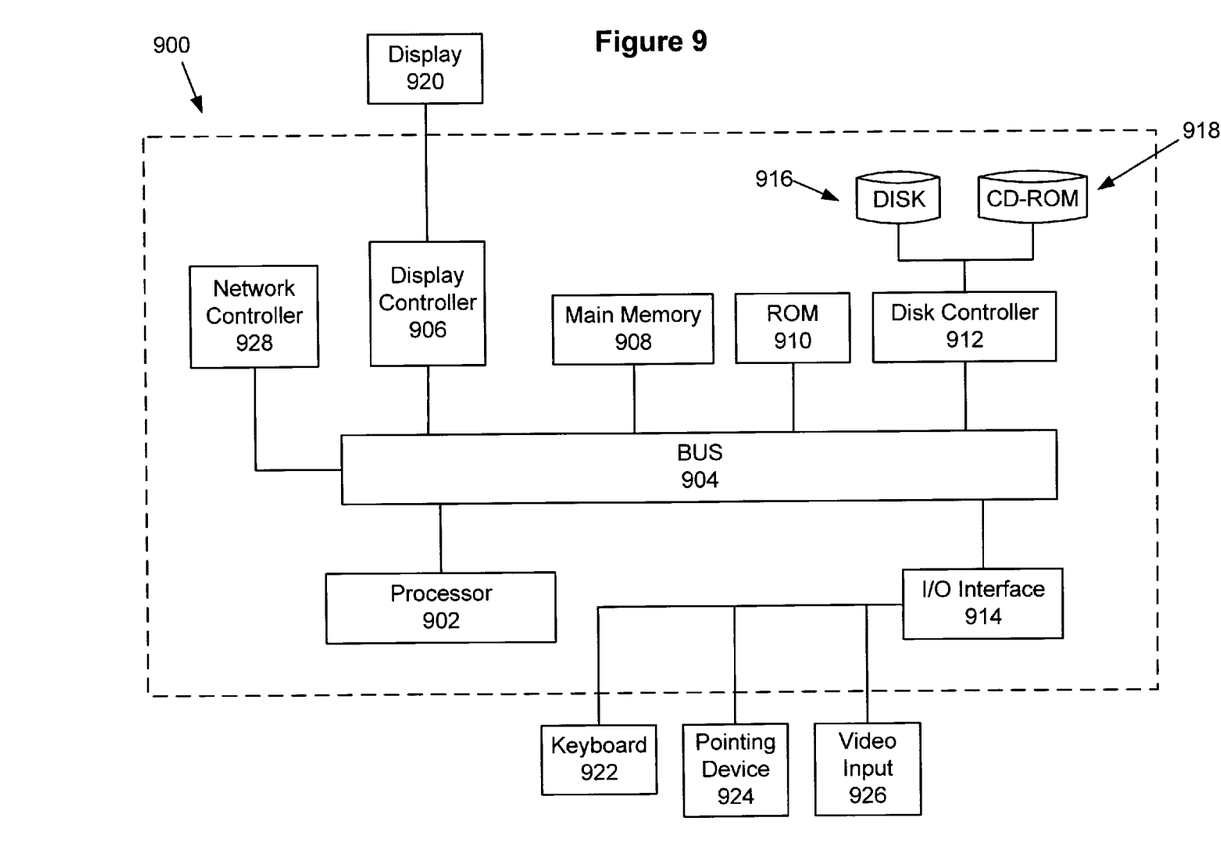
FIG. 9 is a schematic drawing of a processor and a system used to implement the functions corresponding to de-blocking in an exemplary aspect.

In another aspect, implementation of the process detailed below includes a system 900 as shown in FIG. 9. The system 900 is configured to perform a de-blocking filter operation on boundary neighboring pixels between macroblocks in a video coding or decoding process executed in a 16-bytes SIMD register processor environment. The system 900 may be provided with a processing device that is included in a computer, e.g., a computer used in a videoconferencing system.

In one aspect, the system 900 is a personal computer and includes a processor 902, such as a Celeron, Pentium, Core, Centrino or Xeon class processor manufactured by Intel Corporation of Santa Clara, Calif. In another aspect, the system 900 is a personal computer and includes a processor 902, such as a Sempron, Athlon, Phenom or Opteron processor manufactured by Advanced Micro Devices of Sunnyvale, Calif. In further aspects, the processor 902 has a multiple-core architecture. In other aspects, the processor 902 has an ×86 or ×64 instruction set architecture. Of course, those skilled in the art will recognize the advancements described herein are equally applicable to other known processors and that the above-noted processors are exemplary only.

The processor 902 is preferably connected through a BUS 904 to various electronic hardware, including a display controller 906, main memory 908, a read-only memory 910, a disk controller 912, and an input/output interface 914. The disk controller 912 may include configurations to control a hard disk drive 916 and/or an optical disk drive 918. The display controller is preferably connected to a display 920, such as an LCD display or projection system, and the input/output interface 914 is preferably connected to at least a keyboard 922, a pointing device 924 and a video input device 926, such as a video camera. In further aspects, a transmission of video, either pre or post-processing, can be made via network controller 928 through a network (not shown) such as the internet or along an intranet for conducting, e.g., a video-based communication or transmission.

The processing device, including the processor 902, may be configured to execute a set of computer readable instructions and further to execute a computer program as described next, and throughout FIGS. 1-8. The computer readable instructions and the computer program may include instructions that cause the processing device to perform the above-disclosed methods and processes when the instructions are executed by the processing device. In some aspects, the computer readable instructions or the computer program may be tangibly embodied in a memory in the computer, or on a computer-readable storage medium, such as a magnetic, optical or solid-state digital storage medium. Specifically, the computer readable instructions or the computer program may be embodied on at least one of the main memory 908, the ROM 910, the disk 916, or the optical disk 918 shown in FIG. 9.

In H.264/AVC, an adaptive deblocking filter is applied in the coding loop, meaning that further prediction is performed on filtered images. This means that further prediction is performed on filtered images. The filter is designed to remove as much as possible of the blocking and quantization noise and still maintain as much of the image content as possible. It is often a challenge to separate quantization noise and picture content. This is why the filter is highly content adaptive and therefore complex concerning computational operations.

Figure 1:
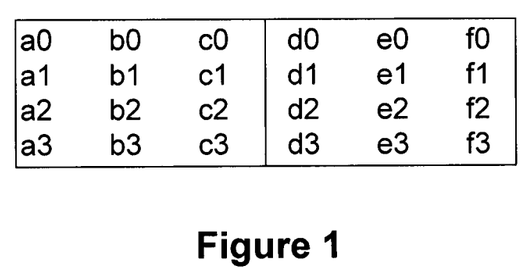
FIG. 1 illustrates a border between two macroblocks denoting pixels involved in a de-block filtering process across the border.

In FIG. 1, an edge between two picture blocks is shown. The letters c and d denote two adjacent pixel positions on each side of the edge, and the other letters denote the 4 horizontal pixel positions closest to the two first-mentioned pixels. According to H.264/AVC, pixels b, c, d, and e may be modified based on a value of each of the pixels and on the characterization of the edge itself. This modification is for equalizing the above-mentioned artifacts. The modification is therefore carried out only when artifacts are likely to occur.

Similar filter operations are performed on all the lines a, b, c, d, e, and f. In the following description, the letters will be used without the numbering.

According to H.264, a strength value (Str) is defined for the edge. This strength value reflects whether artifacts are likely to occur between two blocks and depends on one or more of the following situations being detected:

If any of the two blocks on each side of the boundary is intra coded. Specifically, whether any of the two blocks is coded based on already coded blocks in a present picture.

If any of the two blocks on each side of the boundary includes nonzero transform coefficients.

If the size of motion vectors used to predict the blocks on each side of the boundary exceeds a certain threshold.

Furthermore, to each 4×4 block, a Quantization Parameter (QP) is assigned. The QP representing the edge is the maximum value of the QPs representing the 2 blocks.

Several QP dependant threshold parameters are used:
$\alpha(QP)$,
$\beta(QP)$, and
$\gamma(QP, Str)$.

Figure 2:
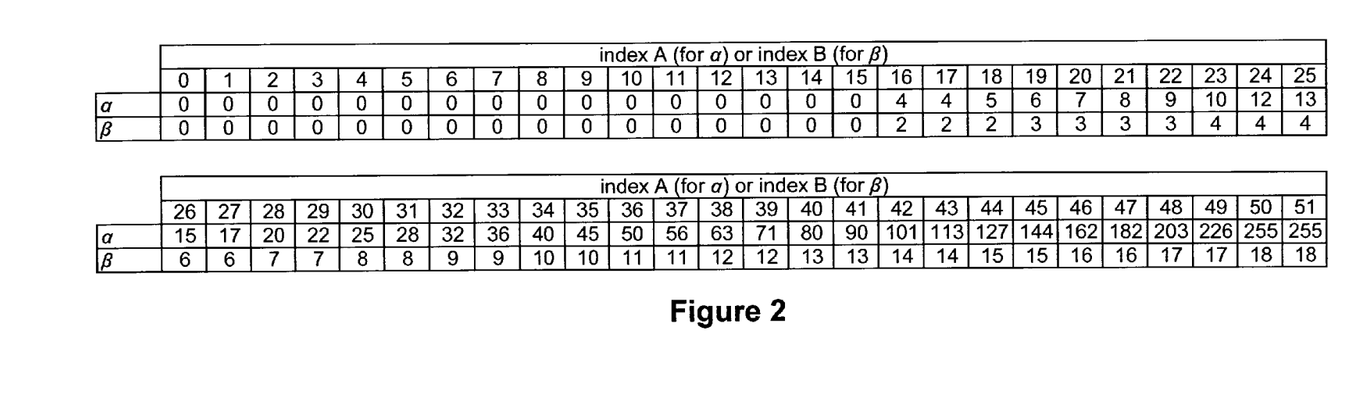
FIG. 2 shows a look-up table from the H.264/AVC specification for threshold values.
Figure 3:
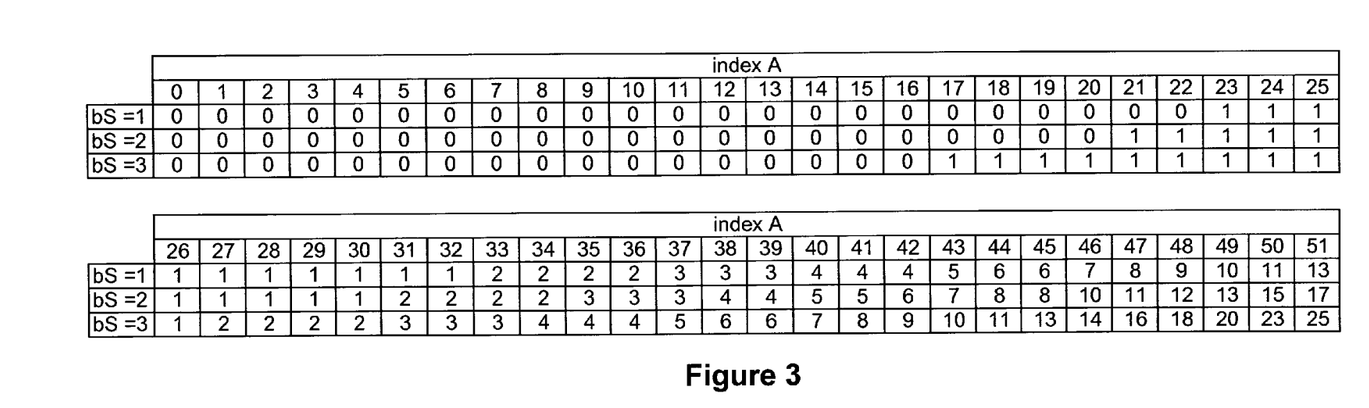
FIG. 3 shows a look-up table from the H.264/AVC specification for clipping values.

$\alpha$, $\beta$ and $\gamma$ are found in the look-up tables shown in FIGS. 2 and 3. FIG. 2 shows the look-up table for determining $\alpha$ and $\beta$ and FIG. 3 shows the look-up table for determining $\gamma$, which is a clipping value. Here, index A and index B denote QP, and bS=1, 2, and 3 corresponds to criteria c, b, a, respectively, which are listed above. Consequently, the deciding criteria a, b, and c also state the boundary characteristics.

Based on these values, a main test is performed determining whether de-blocking filtering is to be carried out or not.

Filtering is performed only if:

$|c-d|<\alpha(QP)$, $|b-c|<\beta(QP)$, and $|d-e|<\beta(QP)$.

If the above statement is true, then a delta is calculated:

$\Delta=(b-4c+4d-e)/8$.

This delta value is then clipped within the range $(-\gamma, \gamma)$. As an example of clipping, if the quantization value is 32 and the characteristic of the boundary comply with criterion b, which corresponds to bS=2, the table indicates that $\gamma$ is 2. This implies that delta should be clipped within the interval $\{-2, 2\}$. Specifically, when delta is greater than 2, delta is assigned the value 2, when delta is less than −2, delta is assigned the value −2, and when delta lies within $\{-2, 2\}$, delta remains unchanged.

Delta is then used to calculate modified values:

$$c'=c+\Delta, \text{ and}$$

$$d'=d-\Delta.$$

An additional test is performed to decide if b also is to be corrected:

$$|a-c|<\beta(QP).$$

If this is true, then a value $\delta$ is calculated:

$$\delta=(2a-4b+c+d)/2.$$

The value is then further clipped to the range $(-\gamma', \gamma')$, wherein $\gamma'$ is a slight modification of $\gamma$. A modification of b is then calculated by means of $\delta$:

$$b'=b+\delta.$$

The test and calculation is similar for e:

$$|c-f|<\beta(QP).$$

If this is true, another value $\delta$ is calculated:

$$\delta=(2f-4e+c+d)/2.$$

The value is then further clipped to the range $(-\gamma', -\gamma')$. A modification of e is then calculated by means of $\delta$:

$$e'=e+\delta.$$

The de-blocking filter algorithm or the like in a SIMD environment, especially for processors with 128-bit vector registers, is now discussed. The SIMD concept is a method of improving performance in applications where highly repetitive operations need to be performed. SIMD is a technique of performing the same operation on multiple pieces of data simultaneously.

Traditionally, when an application is being programmed and a single operation needs to be performed across a large dataset, a loop is used to iterate through each element in the dataset and perform the required procedure. During each iteration, a single piece of data has a single operation performed on it. This is what is known as Single Instruction Single Data (SISD) programming. SISD is generally trivial to implement and both the intent and method of the programmer can quickly be reviewed at a later time.

However, loops such as this are typically very inefficient, as they may have to iterate thousands, or even millions of times. Ideally, to increase performance, the number of iterations of a loop needs to be reduced.

One method of reducing iterations is known as loop unrolling. This takes the single operation that was being performed in the loop, and carries it out multiple times in each iteration. For example, if a loop was previously performing a single operation and taking 10,000 iterations, its efficiency could be improved by performing this operation 4 times in each loop and only having 2500 iterations. The SIMD concept takes loop unrolling one step further by incorporating the multiple actions in each loop iteration, and performing them simultaneously. With SIMD, not only can the number of loop iterations be reduced, but also the multiple operations that are required can be reduced to a single, optimised action.

SIMD does this through the use of so-called "packed vectors". A packed vector, like traditional programming vectors or arrays, is a data structure that contains multiple pieces of basic data. Unlike traditional vectors, however, a SIMD packed vector can then be used as an argument for a specific instruction (for example an arithmetic operation) that will then be performed on all elements in the vector simultaneously. Because of this, the number of values that can be loaded into the vector directly affects performance; the more values being processed at once, the faster a complete dataset can be completed.

When values are stored in packed vectors and 'worked upon' by a SIMD operation, they are actually moved to a special set of CPU registers or register variables where the parallel processing takes place. The size and number of these register variables is determined by the SIMD implementation being used.

The other area that dictates the usefulness of a SIMD implementation is the instruction set. The instruction set is the list of available operations that a SIMD implementation provides for use with packed vectors. These typically include operations to efficiently store and load values to and from a vector, arithmetic operations (add, subtract, divide, square root, etc.), logical operations (AND, OR, etc.) and comparison operations (greater than, equal to, etc.). The more operations a SIMD implementation provides, the simpler it is for a developer to perform the required function. SIMD operations are available directly when writing code in assembly, however, SIMD operations are not available in higher level programming languages such as the C language.

De-blocking filtering according to, e.g., the H.264/MPEG-4 AVC occurs on a per-macroblock basis, with horizontal filtering of the vertical edges performed first, and followed by vertical filtering of the horizontal edges. Both directions of filtering on each macroblock must be conducted before moving to the next macroblock. In prior art software implemented de-blocking, each macroblock is usually loaded twice from the RAM to the CPU register variables, once for vertical filtering, and once for horizontal filtering which is particularly demanding computationally as it involves loading distant memory references.

In one aspect, a method is provided which requires only one load of each macroblock. The steps included are summarized as follows: Load the macroblock—transpose the macroblock—perform horizontal filtering—transpose the macroblock—perform vertical filtering—store the macroblock.

In this way, there is only one load and one store for each macroblock and the implementations of the vertical and the horizontal filtering becomes identical, by actually performing vertical filtering on the transposed macroblock to perform the horizontal filtering. In another aspect, by taking advantage of vector and instruction level parallelism, more advanced processor capabilities than are usually employed in deblocking filter calculations are utilized. This approach deviates from all other known approaches in that the entire macroblock is being transposed. By exploiting enhanced computational resources available in modem processors, a full macroblock transposition (as described in, e.g., F. Franchetti and M. Püschel "Generating SIMD Vectorized Permutations," In Proceedings of International Conference on Compiler Construction (CC) 2008, which is incorporated herein in its entirety by reference, hereinafter referred to as Franchetti) is relatively inexpensive, and the discussed approach becomes particularly efficient.

Franchetti illustrates a highly efficient method of transposing an 8×8 matrix employing a minimal number block transfer operations that are implemented using vector shuffle instructions. An algorithm process according to an aspect of the invention is generalized to a single 16×16 transposition for the luminance macroblock and to a 2×8×8 transposition for the two chrominance macroblocks. In modem processors, a single register can typically hold 16 pixels. Therefore, a preferable choice according to this aspect is to calculate the transpose for the U and V chrominance macroblocks simultaneously using 16 byte instructions.

Modern processors contain an increasing number of execution units that generally remain idle. In the implementation of the de-blocking filter according to a preferred aspect of the invention, all execution units are kept busy most of the time, since the algorithm is formulated in a way that takes maximum advantage of Single Instruction Multiple Data (SIMD) instructions and Instruction Level Parallelism (ILP).

One aspect contributing to the uniqueness of this implementation is that it targets execution in environments where it can best exploit the advantages of ILP where other known implementations are believed to attempt to parallelize more general purpose algorithms.

Figure 4:
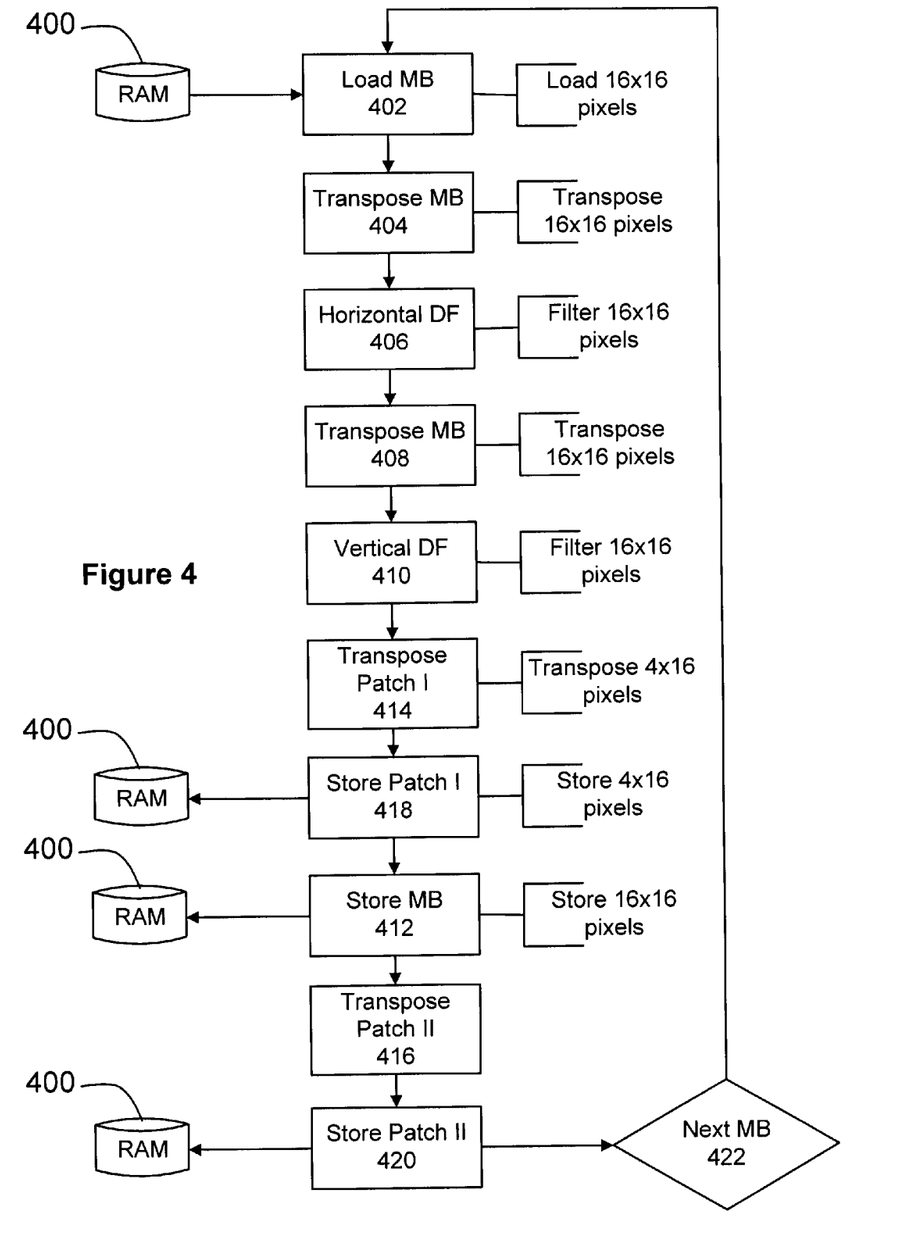
FIG. 4 is a flow chart illustrating an embodiment where a luminance macroblock is filtered.
Figure 5:
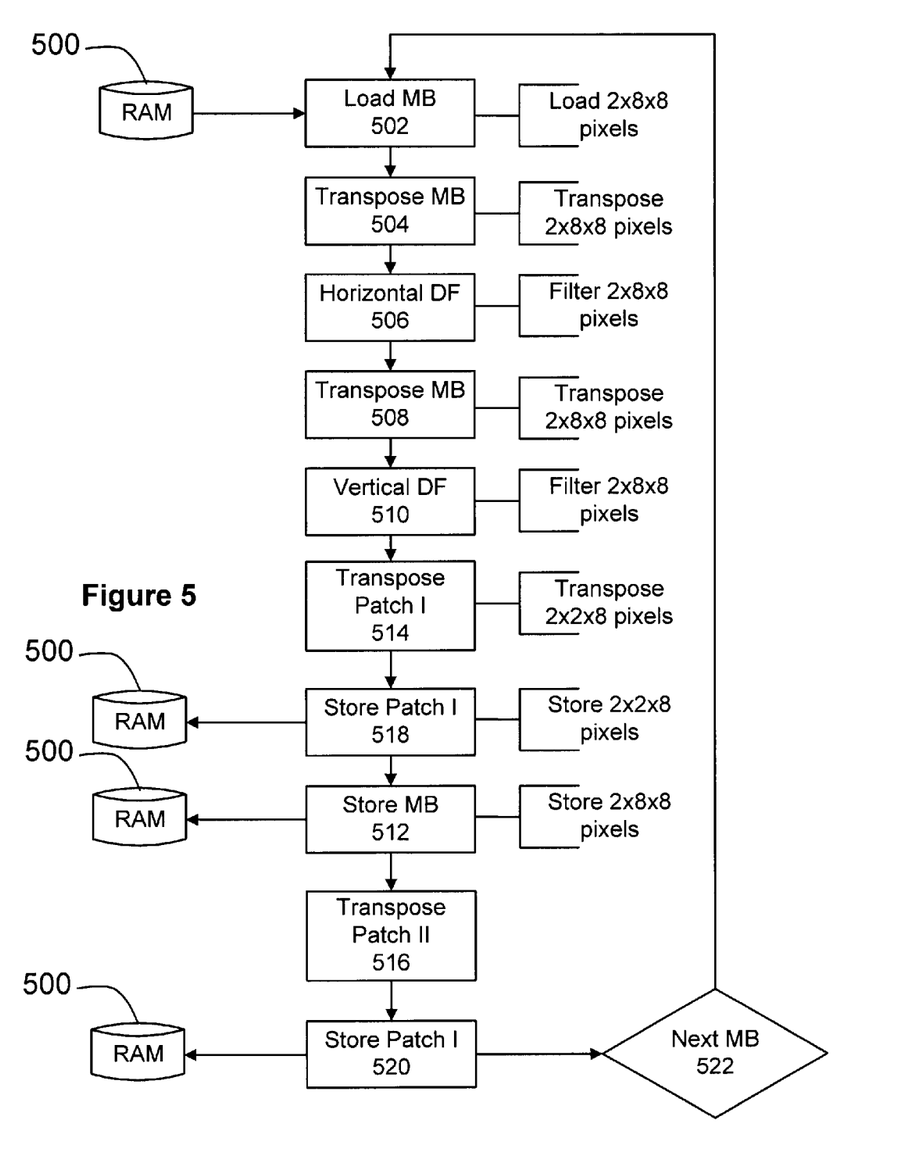
FIG. 5 is a flow chart illustrating an embodiment where two chrominance macroblocks are filtered.

The flow charts shown in FIGS. 4 and 5 describe de-blocking filtering (DF) of one luminance macroblock (FIG. 4) and two chrominance macroblocks (FIG. 5).

Referring now to the flow charts, one embodiment is depicted in FIG. 4. First, a macroblock is loaded at step 402 from random access memory (RAM) 400 to a 16-byte aligned register variable matrix using efficient 16 byte aligned load. In a preferred aspect, the macroblock is a luminance macroblock, as noted above. The matrix is then efficiently transposed at step 404 by a SIMD instruction using a minimal number of block transfer operations. Horizontal filtering is then preformed on the transposed macroblock at step 406. Further, the matrix is transposed back to its original orientation at step 408. Vertical filtering is performed using the same algorithm for horizontal filtering mentioned above at step 410. The macroblocks are stored back in the RAM 400 at step 412.

In additional aspects, the region denoting the horizontal overlap (Patch 1) used for calculating the next macroblock downward, and the region denoting the vertical overlap (Patch 2) used for calculating the next macroblock to the right are respectively transposed at steps 414 and 416, respectively, and stored to RAM 400 for later use at steps 418 and 420, respectively.

At step 422, processing of a next macroblock is started and the above process is repeated for the next macroblock.

As shown in FIG. 5, a similar process as discussed above in regards to FIG. 4 is performed for, in a preferred aspect, two chrominance macroblocks.

Specifically, in the embodiment depicted in FIG. 5, a macroblock is loaded at step 502 from RAM 500 to a 16-byte aligned register variable matrix using efficient 16 byte aligned load. As previously noted, in a preferred aspect, the macroblock includes two chrominance macroblocks. The matrix is then efficiently transposed at step 504 by a SIMD instruction using a minimal number of block transfer operations. Horizontal filtering is then preformed on the transposed macroblock at step 506. Further, the matrix is transposed back to its original orientation at step 508. Vertical filtering is performed using the same algorithm for horizontal filtering mentioned above at step 510. The macroblocks are stored back in the RAM 500 at step 512.

In additional aspects, the region denoting the horizontal overlap (Patch 1) used for calculating the next macroblock downward, and the region denoting the vertical overlap (Patch 2) used for calculating the next macroblock to the right are respectively transposed at steps 514 and 516, respectively, and stored to RAM 500 for later use at steps 518 and 520, respectively.

At step 522, processing of a next macroblock is started and the above process is repeated for the next macroblock.

Figure 6:
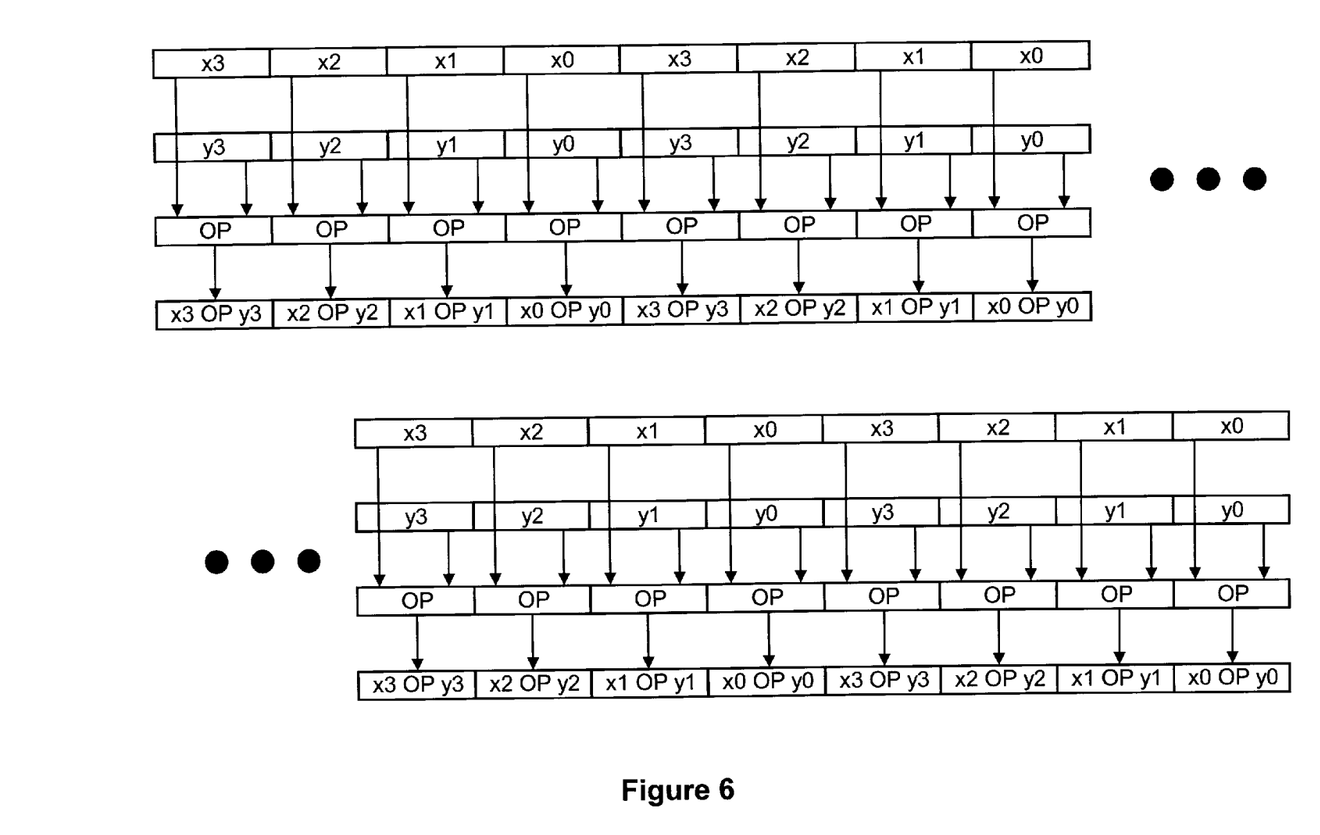
FIG. 6 is a block diagram illustrating a parallel operation on two vector register variables.

As previously indicated, Single Instruction Multiple Data (SIMD) instructions present in current generation x86 microprocessors allow a single common operation to be executed simultaneously across up to 16 sets of data. For example, when data is formatted correctly within the processor's SIMD registers, an addition operation can be calculated on 16 individual sets of data yielding 16 results simultaneously, as is depicted in FIG. 6. The temporal cost of executing this operation is identical to executing a single addition operation on a single dataset with normal processor instructions upon general purpose registers.

The real cost of processing occurs in the preparation of the data set to be operated upon. In the circumstance of performing vertical filtering of horizontal edges, it is possible to load all the values of a single line of input data using a single, low execution cost load since SIMD provides instructions for loading 16 bytes linearly using a single instruction.

An algorithm according to one aspect exploits the fact that the processor provides enough register space to store an entire 16×16 set of data which is the exact size of a luminance macroblock or two chrominance macroblocks. By performing 16 consecutive reads of 16 linear aligned values into 16 SIMD register variables each capable of storing 16 values, the entire data set for operating can be stored within the processor's SIMD register variables and can be operated upon without any memory related latency. At this point, a transposition algorithm can be applied to align the vertical edges within the register variables so they can be acted upon as a horizontal edge which is the desired internal orientation for SIMD processing. Before storing the values again, a second transpose operation is applied to reorient the edges to their original position.

An alternative would be to selectively load and position each pixel value individually at a higher instruction count cost to produce the same results. Additionally, since the same data set is used for processing in the alternate orientation, this process is theoretically entirely redundant as the transposition operation renders the data in a perfect match for de-blocking filtering of macroblocks.

Figure 7:
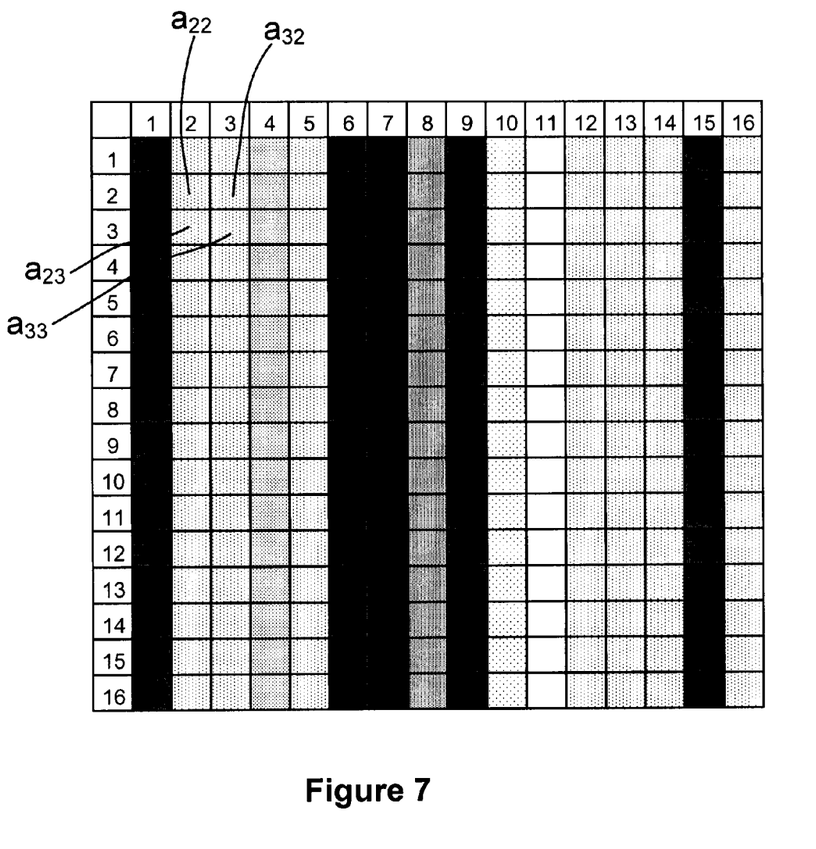
FIG. 7 is a block diagram illustrating a macroblock inserted in 16 16-bytes register variables before transposing.
Figure 8:
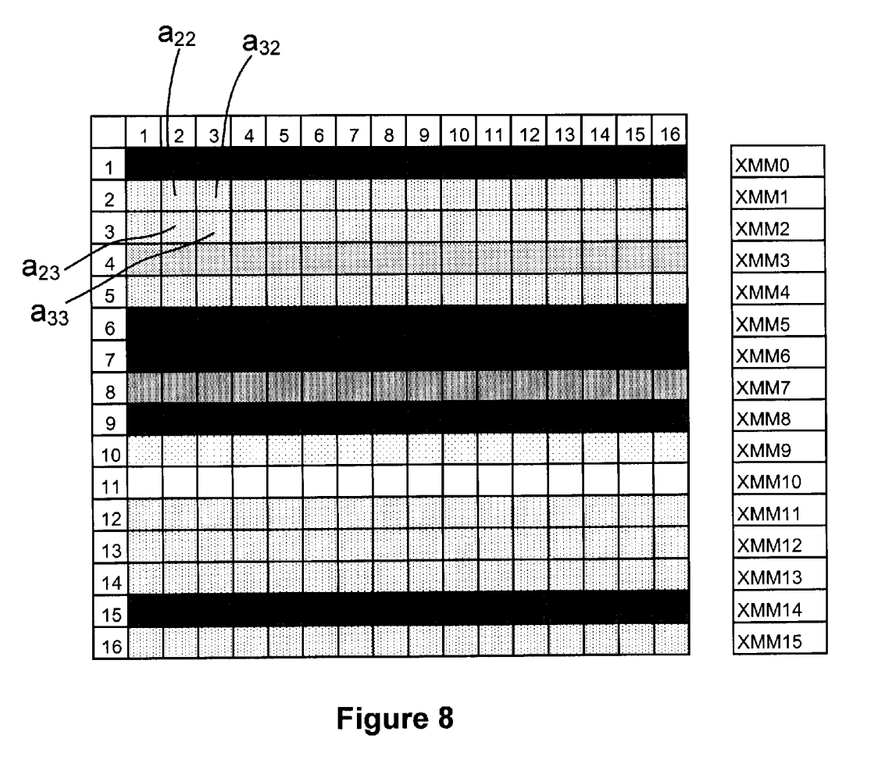
FIG. 8 is a block diagram illustrating a macroblock inserted in 16 16-bytes register variables after transposing.

As previously indicated, in order to apply the same high performance, vectorized algorithm to vertical columns of samples as was used for the horizontal rows, it is necessary to transpose the sample matrix to realign the vertical columns as horizontal rows. This process is the transposition step. FIGS. 7 and 8 represent the data set where each row of sample data is stored in a single vector register variable. FIG. 7 shows that when operating on vertical columns, the data set is not oriented ideally since a single column of samples is spread across 16 vector register variables. The diagram shown in FIG. 8 which is a transposed representation, demonstrating how, after transposing the set, the orientation is ideal for SIMD instructions as each column is now stored within a single vector register variable. The result is that 16 simultaneous cross-column operations can occur now that the data has been prepared for this purpose.

While other implementations choose to transpose the macroblock partially on-the-fly to prepare for an SIMD friendly filtering, an objective of is to provide a transposition of the macroblock in one efficient step—which also paves the way for internal storage of the macroblock in register variables and makes it unnecessary to load the macroblock twice. Obviously, this also leads to identical implementations of horizontal and vertical filtering, which is a major benefit, as only vertical filtering has been previously regarded to be SIMD friendly.

As resolution of the source frame used in video conferencing increases, it becomes increasingly difficult to efficiently load and store a macroblock without large performance penalties. For example, for 1080p resolution, the distance between the first and the last byte in a 16×16 pixel macroblock is about 30 Kbytes. Loading these 256 bytes one at a time is obviously not efficient even though the memory in use occupies less than the 64 Kbytes L1 data cache available in modern processors. On the other hand, a primary benefit provided by the disclosed process provides for loading data in chunks of 16 bytes using an efficient 16 byte aligned load.

Modern processors can typically execute 2 or 3 16-byte instructions per clock cycle, in particular if many independent instructions are grouped in the same area. Thus, 16 consecutive 16 byte loads that are independent can be executed in any order by the processor's out of order execution core. The overall latency decreases because independent instructions may hide each other's latency.

While loading the 256 byte samples individually may appear advantageous since the transposition operation would not be required, the advantages of SIMD friendly and cache friendly execution is great enough, and the cost of a full 16×16 matrix transpositions becomes negligible in comparison.

Note that the term 'register variable' does not necessarily refer to one physical register in processor hardware. Implementations include assembly code and so-called intrinsic functions. For example, the Intel C/C++ compiler intrinsic equivalents are special C/C++ extensions that allow using the syntax of C function calls and C variables instead of hardware registers may be implemented. A variable in intrinsic functions intended to be inserted in a register is not guaranteed to be inserted in an actual hardware register, but it is handled accordingly and equally effective as if it were. The term 'register variable' can therefore be interpreted both as a physical hardware register as well as a register variable handled as if it was inserted in a hardware register.

There are a number of advantages connected to the above disclosure. In some aspects, the process requires fewer loads—16 instead of 256—in addition to more effective and aligned loads. The SIMD environment also provides simultaneous loads—16 consecutive 16 byte loads instead of many single "blocking" loads. Consequently, a reduced need on memory access is created, leading to increased macroblock transposition performance and increased horizontal filtering performance as it reuses the highly efficient vertical filter.

Obviously, numerous modifications and variations are possible in light of the above teachings. It is therefore to be understood that within the scope of the appended claims, the invention may be practiced otherwise than as specifically described herein.

The invention claimed is:

1. A method for performing a de-blocking filter operation on boundary neighboring pixels between macroblocks in a video coding or decoding process executed in a 16-bytes SIMD register processor, comprising:

loading a first set of data, from an electronic memory connected to said processor, constituting an entirety of one luminance macroblock or an entirety of two chrominance macroblocks from a RAM to a group of 16 16-bytes horizontal SIMD register variables by inserting each row of the macroblock(s) in the respective register variables;

executing a transpose instruction on all of said first set of data in said group of 16 16-bytes horizontal SIMD register variables, creating a second set of data which is stored in said group of 16 16-bytes horizontal SIMD register variables;

performing a horizontal de-blocking filter operation, to create a third set of data, on all of said second set of data in said group of 16 16-bytes horizontal SIMD register variables and a corresponding set of boundary pixel data of a first neighboring macroblock;

executing a transpose instruction on all of said third set of data in said group of 16 16-bytes horizontal SIMD register variables, creating a fourth set of data which is stored in said group of 16 16-bytes horizontal SIMD register variables;

performing a vertical de-blocking filter operation, to create a fifth set of data, on all of said fourth set of data in said group of 16 16-bytes horizontal SIMD register variables and a corresponding set of boundary pixels data of a second neighboring macroblock; and storing said fifth set of data to said electronic memory.

2. The method according to claim 1, wherein the horizontal and vertical de-blocking filter operations are de-blocking filter operations according to H.264 or MPEG-4 standard.

3. The method according to claim 1, further comprising:
transforming and storing a first subset of said fifth set of data corresponding to boundary pixel data relative to a first adjacent macroblock on the right hand side of said one luminance macroblock or two chrominance macroblocks.

4. The method according to claim 3, further comprising:
transforming and storing a second subset of said fifth set of data corresponding to boundary pixel data relative to a second adjacent macroblock below said one luminance macroblock or two chrominance macroblocks.

5. The method according to claim 1, wherein said storing includes storing said fifth set of data in said electronic memory so as to replace said first set of data.

6. The method according to claim 1, wherein:
the performing the horizontal de-blocking filter operation on all of said second set of data is performed in a single step; and
the performing the vertical de-blocking filter operation on all of said fourth set of data is performed in a single step.

7. A system for performing a de-blocking filter operation on boundary neighboring pixels between macroblocks in a video coding or decoding process executed in a 16-bytes SIMD register processor, comprising:

means for loading a first set of data constituting an entirety of one luminance macroblock or an entirety of two chrominance macroblocks from a random access memory (RAM) to a group of 16 16-bytes horizontal SIMD register variables by inserting each row of the block(s) in the respective register variables;

means for executing a transpose instruction on all of said first set of data in said group of 16 16-bytes horizontal SIMD register variables, creating a second set of data which is stored in said group of 16 16-bytes horizontal SIMD register variables;

means for performing a horizontal de-blocking filter operation, to create a third set of data, on all of said second set of data in said group of 16 16-bytes horizontal SIMD register variables and a corresponding set of boundary pixel data of a first neighboring macroblock;

means for executing a transpose instruction on all of said third set of data in said group of 16 16-bytes horizontal SIMD register variables, creating a fourth set of data which is stored in said group of 16 16-bytes horizontal SIMD register variables;

means for performing a vertical de-blocking filter operation, to create a fifth set of data, on all of said fourth set of data in said group of 16 16-bytes horizontal SIMD register variables and a corresponding set of boundary pixels data of a second neighboring macroblock; and means for storing said fifth set of data to said RAM.

8. The system according to claim 7, wherein the horizontal and vertical de-blocking filter operations are de-blocking filter operations according to H.264 or MPEG-4 standard.

9. The system according to claim 7, further comprising:
means for transforming and storing a first subset of said fifth set of data corresponding to boundary pixel data relative to a first adjacent macroblock on the right hand side of said one luminance macroblock or two chrominance macroblocks.

10. The system according to claim 9, further comprising:
means for transforming and storing a second subset of said fifth set of data corresponding to boundary pixel data relative to a second adjacent macroblock below said one luminance macroblock or two chrominance macroblocks.

11. The system according to claim 7, further comprising:
means for storing said fifth set of data in the RAM by replacing said first set of data with said fifth set of data.

12. The system according to claim 7, wherein:
the means for performing the horizontal de-blocking filter operation performs the horizontal de-blocking filter operation on all of said second set of data in a single step; and
the means for performing the vertical de-blocking filter operation performs the vertical de-blocking filter operation on all of said fourth set of data in a single step.

13. A non-transitory computer readable medium including computer executable instructions, wherein the instructions, when executed by a 16-bytes SIMD register processor, cause said processor to implement a method of performing a de-blocking filter operation on boundary neighboring pixels between macroblocks in a video coding or decoding process, the method comprising:
loading a first set of data, from an electronic memory connected to said processor, constituting an entirety of one luminance macroblock or an entirety of two chrominance macroblocks from a RAM to a group of 16 16-bytes horizontal SIMD register variables by inserting each row of the macroblock(s) in the respective register variables;
executing a transpose instruction on all of said first set of data in said group of 16 16-bytes horizontal SIMD register variables, creating a second set of data which is stored in said group of 16 16-bytes horizontal SIMD register variables;
performing a horizontal de-blocking filter operation, to create a third set of data, on all of said second set of data in said group of 16 16-bytes horizontal SIMD register variables and a corresponding set boundary pixel data of a first neighboring macroblock;
executing a transpose instruction on all of said third set of data in said group of 16 16-bytes horizontal SIMD register variables, creating a fourth set of data which is stored in said group of 16 16-bytes horizontal SIMD register variables;
performing a vertical de-blocking filter operation, to create a fifth set of data, on all of said fourth set of data in said group of 16 16-bytes horizontal SIMD register variables and a corresponding set of boundary pixels data of a second neighboring macroblock; and
storing said fifth set of data to said electronic memory.

14. The computer readable medium according to claim 13, wherein the horizontal and vertical de-blocking filter operations are de-blocking filter operations according to H.264 or MPEG-4 standard.

15. The computer readable medium according to claim 13, including computer executable instructions which cause said processor to implement the method further comprising:
transforming and storing a first subset of said fifth set of data corresponding to boundary pixel data relative to a first adjacent macroblock on the right hand side of said one luminance macroblock or two chrominance macroblocks.

16. The computer readable medium according to claim 15, including computer executable instructions which cause said processor to implement the method further comprising:
transforming and storing a second subset of said fifth set of data corresponding to boundary pixel data relative to a second adjacent macroblock below said one luminance macroblock or two chrominance macroblocks.

17. The computer readable medium according to claim 13, wherein said storing includes storing said fifth set of data in said electronic memory so as to replace said first set of data.

18. The computer readable medium according to claim 13, wherein:
the performing the horizontal de-blocking filter operation on all of said second set of data is performed in a single step; and
the performing the vertical de-blocking filter operation on all of said fourth set of data is performed in a single step.

* * * * *